United States Patent

Oba et al.

[11] Patent Number: 5,558,597
[45] Date of Patent: Sep. 24, 1996

[54] HYDRAULIC CONTROL SYSTEM FOR CONTROLLING OIL PRESSURE BASED ON TEMPERATURE

[75] Inventors: Hidehiro Oba, Aichi-ken; Hiromichi Kimura, Okazaki, both of Japan

[73] Assignee: Toyota Jidosha Kabushiki Kaisha, Toyota, Japan

[21] Appl. No.: 280,464

[22] Filed: Jul. 26, 1994

[30] Foreign Application Priority Data

Jul. 26, 1993 [JP] Japan .................................. 5-203636

[51] Int. Cl.$^6$ .................................................. F16H 61/04
[52] U.S. Cl. ....................................................... 477/98
[58] Field of Search ..................... 477/97, 98, 156, 477/158

[56] References Cited

U.S. PATENT DOCUMENTS

| | | | |
|---|---|---|---|
| 4,690,017 | 9/1988 | Taniguchi et al. | 364/424.1 |
| 4,998,449 | 3/1991 | Baba et al. | 477/98 |
| 5,014,575 | 5/1991 | Fujiwara et al. | 477/98 X |
| 5,029,492 | 7/1991 | Kiuchi | 477/98 |
| 5,058,014 | 10/1991 | Saitou et al. | 477/98 X |
| 5,072,630 | 12/1991 | Kikuchi et al. | 477/98 |
| 5,211,680 | 5/1993 | Sumimoto et al. | 477/98 X |
| 5,293,789 | 3/1994 | Goto et al. | 477/98 X |

FOREIGN PATENT DOCUMENTS

| | | | |
|---|---|---|---|
| 61-127955 | 6/1986 | Japan | 477/98 |
| 62-118145 | 5/1987 | Japan . | |
| 64-35153 | 2/1989 | Japan . | |
| 3-213766 | 9/1991 | Japan | 477/98 |
| 3-223562 | 10/1991 | Japan | 477/98 |
| 3-288061 | 12/1991 | Japan . | |
| 4-185961 | 7/1992 | Japan | 477/98 |

*Primary Examiner*—Khoi Q. Ta
*Attorney, Agent, or Firm*—Oblon, Spivak, McClelland, Maier, & Neustadt, P.C.

[57] ABSTRACT

A hydraulic control system for an automatic transmission having frictional devices and a valve mechanism for feeding an oil pressure to the frictional devices. This hydraulic control system controls the applying pressure of the frictional devices directly on the basis of electric signals. For this control, the hydraulic control system comprises: an oil temperature detector for detecting the temperature of the oil to actuate the frictional devices; and an oil pressure command value output unit for making the output interval of the oil pressure command value to be outputted at a plurality of stages, that is, at least any one of lapse time periods till a subsequent oil pressure command value Is outputted, longer in case the detected oil pressure is low, than in case the detected oil pressure is high.

7 Claims, 5 Drawing Sheets

5,558,597

HYDRAULIC CONTROL SYSTEM FOR CONTROLLING OIL PRESSURE BASED ON TEMPERATURE

BACKGROUND OF THE INVENTION

The present invention relates to a hydraulic control system for controlling the oil pressure of frictional engagement means participating in a shift of an automatic transmission, by an electrically controllable valve mechanism.

In case a shift is to be executed by the automatic transmission, the working oil pressure to be fed to the frictional engagement means such as a clutch or brake participating in the shift is so electrically controlled (or regulated) as to establish predetermined hydraulic characteristics by using a duty solenoid valve or linear solenoid valve thereby to improve the shifting characteristics. Generally speaking, the control characteristics are set while estimating the viscosity of the oil at an ordinary oil temperature. In case, however, the oil has a low temperature, its viscosity is high so that the pressure regulating characteristics can not be achieved, as expected. Even if the oil pressure target value is commanded along a solid curve, as illustrated in FIG. 8, the actual oil pressure so responds as is plotted by a broken curve. Specifically, the actual oil pressure delays in response from the oil pressure target value. In the characteristics, only the oil pressure target value advances, but the actual oil pressure rises with a delay.

The characteristics of this actual oil pressure will be specifically described in the following. The target oil pressure is gradually changed at the initial stage of a shift but is raised at the final stage of the shift, so that the difference between the actual oil pressure and the target value increases to cause the change in the actual oil pressure abruptly. At the final stage of the shift, the actual oil pressure abruptly increases to give a torque capacity abruptly to the frictional engagement means. When the frictional engagement means thus acquires the torque capacity abruptly, the output torque abruptly rises, as plotted by a broken curve. This abrupt rise of the output torque invites a disadvantage that the shifting shock is caused.

In order to eliminate such disadvantage, the occurrence of the shifting shock is to be suppressed in the system, as disclosed in Japanese Patent Laid-Open No. 35153/1989, by changing the oil pressure target value according to the oil temperature. In other words, this system raises the oil pressure target value to eliminate the response delay of the oil pressure at a low temperature by increasing the output of the actual oil pressure. According to this system, the applying oil pressure rises while a packing clearance is being reduced by compressing the return spring of the frictional engagement means by the oil pressure. Even after the packing clearance has been reduced, however, the control with the high output continues so that the high oil pressure is further fed with the reduced packing clearance. As a result, the applying oil pressure may abruptly rise to cause the shifting shock, as in the case of the description made with reference to FIG. 8.

SUMMARY OF THE INVENTION

A main object of the present invention is to provide a hydraulic control system for preventing a shifting shock when the applying pressure of frictional engagement means of an automatic transmission is to be directly controlled in an electrical manner.

Another object of the present invention is to prevent the shifting shock due to a response delay of the rise of an actual oil pressure in case the oil has a low temperature but a high viscosity.

In order to achieve these objects, according to the present invention, there is provided a hydraulic control system for an automatic transmission having a valve mechanism for controlling an oil pressure in response to electrical oil pressure command values inputted, and frictional engagement means to be actuated by the oil pressure, which system comprises: oil temperature detecting means for detecting the temperature of the oil to actuate the frictional engagement means; and oil pressure command value outputting means for outputting the electrical oil pressure command values predetermined stepwise for a shift command, to make at least any one of lapse time periods till the oil pressure command value longer in case the detected oil temperature is low than in case the detected oil temperature is high.

In case, therefore, the applying pressure of the frictional engagement means is directly controlled on the basis of the electrical signals, the output interval of the oil pressure command values to be outputted at the plurality of steps, i.e., at least any one of the lapse time periods till the subsequent oil pressure command value is outputted is made longer in case the oil temperature is low than in case the oil temperature is high, so that the actual oil pressure is awaited to approach more the oil pressure command value at that time before a subsequent oil pressure command value is outputted. As a result, the applying pressure of the frictional engagement means shifts, as expected, so that the abrupt change in the output torque, which might otherwise follow the abrupt change in the applying pressure, can be eliminated to prevent the shifting shock.

The above and further objects and novel features of the present invention will more fully appear from the following detailed description when the same is read with reference to the accompanying drawings. It is to be expressly understood, however, that the drawings are for purpose of illustration only and are not intended as a definition of the limits of the invention.

DETAILED DESCRIPTION OF THE PREFERRED EMBODIMENT

Figure 1:
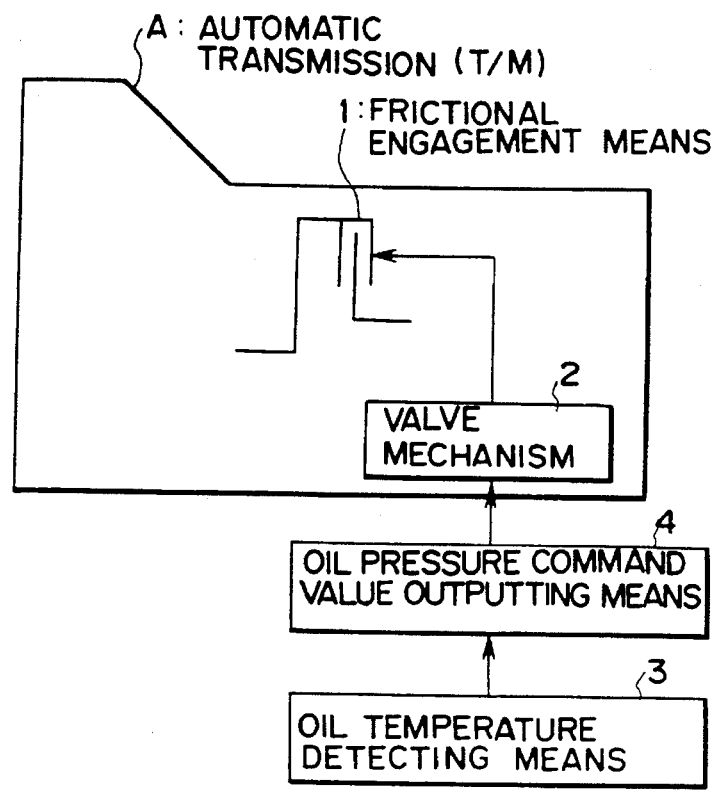
FIG. 1 is a diagram showing a construction of the present invention with functional means.

In FIG. 1, a control system of the present invention is schematically shown with functional means. The oil pressure control system shown in FIG. 1 is used for an automatic transmission A having frictional engagement means 1 and a valve mechanism 2 for feeding the frictional engagement means 1 with an oil pressure. The hydraulic control system is constructed to include: oil pressure detecting means 3 for detecting the temperature of the oil to actuate the frictional engagement means 1; and oil pressure command value outputting means 4 for making longer at least either of the time periods, which have elapsed till a subsequent oil pressure command value is outputted, if the detected oil temperature is low, than that of the case in which the oil temperature is high.

In the present invention, the frictional engagement means 1 has its oil pressure controlled directly by controlling the valve mechanism 2 electrically. Specifically, the valve mechanism 2 is fed at every predetermined time intervals with a predetermined oil pressure command value after a shift command so that the actual oil pressure of the frictional engagement means 1 changes according to that oil pressure command value. In the present invention, moreover, the temperature of the oil for actuating the frictional engagement means 1 is detected by the oil pressure detecting means 3. If the detected oil temperature is low, the oil pressure command value outputting means 4 makes longer at least either of the time periods, which have elapsed till a subsequent oil pressure command value is outputted, than that of the case in which the oil temperature is high. In short, a subsequent oil pressure value is not outputted before the actual oil pressure approaches the oil pressure command value previously inputted. In other words, even when the subsequent oil pressure command value is inputted during a shift to the valve mechanism 2, then the frictional engagement means 1 has its torque capacity changed, as expected. As a result, the output torque will not experience a change higher than a predetermined one, that is, will be freed from an abrupt change so that the accompanying shifting shock will not increase.

Figure 2:
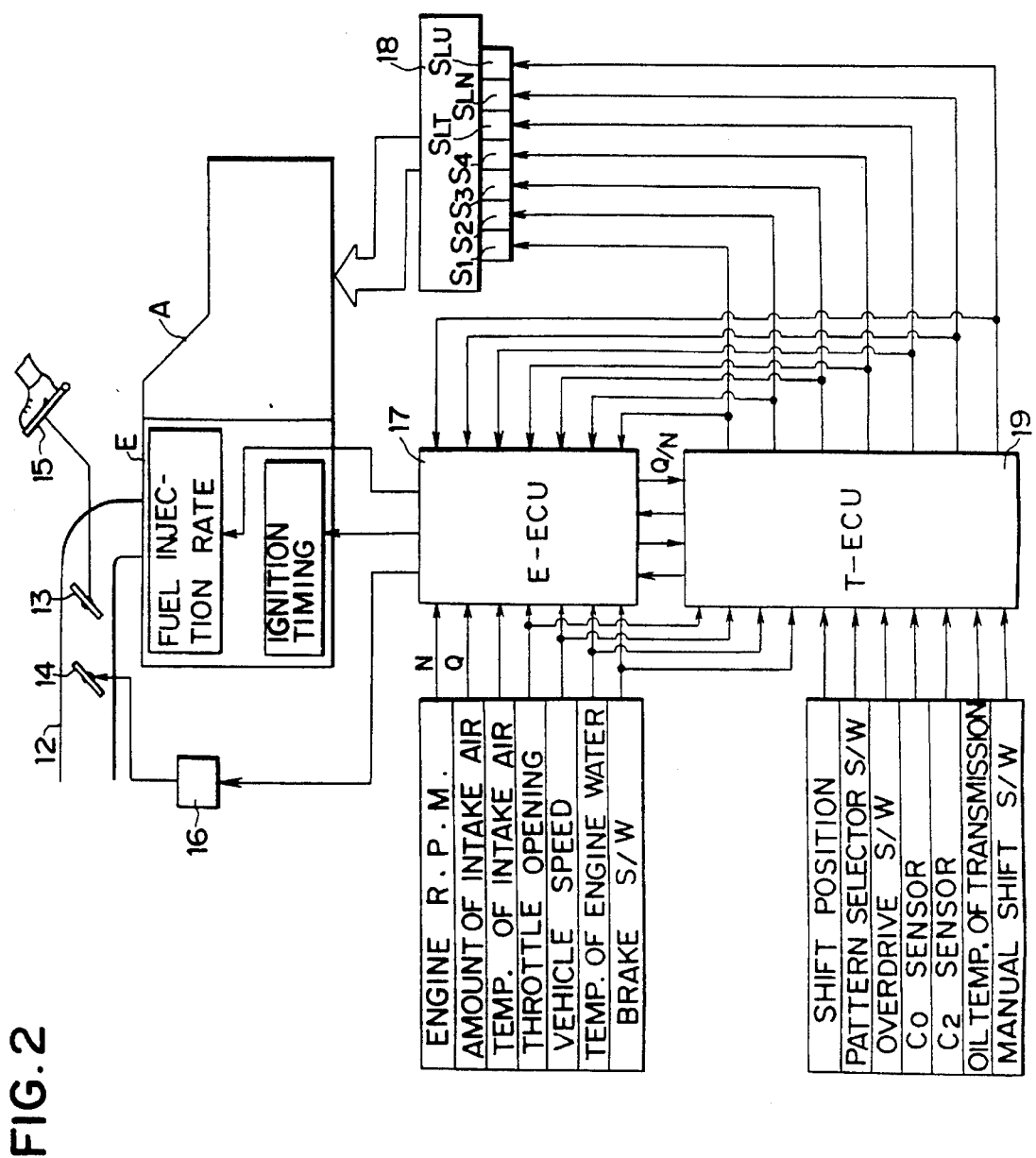
FIG. 2 s a control flow chart showing one embodiment of the present invention.

The present invention will be described more specifically in connection with its one embodiment. FIG. 2 is a block diagram showing the entirety of the embodiment of the present invention. An engine E connected to the automatic transmission A is equipped in its intake pipe 12 with a main throttle valve 13 and a sub-throttle valve 14 located upstream of the former. The main throttle valve 13 is so connected to an accelerator pedal 15 that it is controlled according to the depression of the accelerator pedal 15. On the other hand, the sub-throttle valve 14 is controlled by a motor 16. There is provided an engine electronic control unit (E-ECU) 17 for controlling the motor 16 to regulate the opening that sub-throttle valve 14 and for controlling the fuel injection rate and the ignition timing of the engine E. This electronic control unit 17 is composed mainly of a central processing unit (CPU), memory units (RAM and ROM) and an input/output interface and is fed as control data with a variety of signals including an engine (E/G) R.P.M. N, an amount Q of intake air, a temperature of intake air, a throttle opening, a vehicle speed, a temperature of engine water and a brake switch.

In the automatic transmission A, a hydraulic control unit 18 controls the shift, a lockup clutch, a line pressure and/or an applying pressure of a predetermined frictional engagement means. The hydraulic control unit 18 is electrically controlled and equipped with: first to third shift solenoid valves $S_1$ to $S_s$ for executing the shift; a fourth solenoid valve $S_4$ for controlling an engine braking state; a linear solenoid valve $S_{LT}$ for controlling the line pressure; a linear solenoid valve $S_{SLN}$ for controlling an accumulator back pressure; and a linear solenoid valve $S_{LU}$ for controlling the applying pressure of the lock-up clutch or a predetermined frictional engagement means.

There is further provided an automatic transmission electronic control unit (T-ECU) 19 for controlling the shift, the line pressure and/or the accumulator back pressure by outputting signals to those solenoid valves. This electronic control unit 19 is composed mainly of a central processing unit (CPU), memory units (RAM and ROM) and an input/output interface and is fed as the control data with the throttle opening, the vehicle speed, the engine water temperature, the brake switch signal, a shift position signal, a pattern select switch signal, an overdrive switch signal, a signal coming from a $C_0$ sensor for detecting the R.P.M. of a later-described clutch $C_0$, a signal coming from a $C_2$ sensor for detecting the R.P.M. of a later-described second clutch $C_2$, an oil temperature of the automatic transmission and a signal of a manual shift switch.

Moreover, the automatic transmission electronic control unit 19 and the engine electronic control unit 17 are connected with each other for data communications. Specifically, signals such as a signal of an amount (Q/N) of intake air per revolution are sent from the engine electronic control unit 17 to the automatic transmission electronic control unit 19, whereas signals such as a signal equivalent to a command signal for each solenoid valve or a signal for commanding a gear stage are sent from the automatic transmission electronic control unit 19 to the engine electronic control unit 17.

More specifically, the automatic transmission electronic control unit 19 decides the gear stage, the ON/OFF of the lockup clutch, or the regulated pressure level of the line pressure or the applying pressure on the basis of the data inputted and the map stored in advance and outputs a command signal to a predetermined solenoid valve on the basis of the decision result to decide a failure or perform a control based on the decision. On the other hand, the engine electronic control unit 17 not only controls The fuel injection rate, the ignition timing and/or The opening of the sub-throttle valve 14 on the basis of the data inputted but also lowers the output torque temporarily by reducing The fuel injection rate at the shifting time of the automatic transmission A, by changing the ignition timing and/or by throttling the opening of the sub-throttle valve 14.

Figure 3:
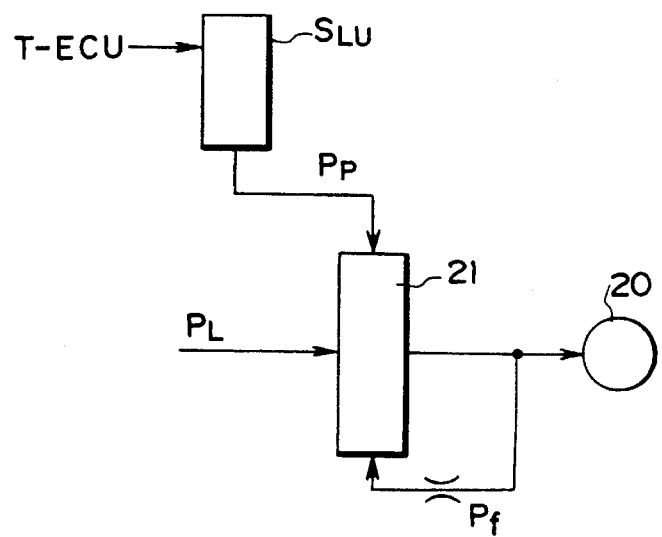
FIG. 3 is a diagram showing a portion of a valve mechanism of the embodiment of the present invention.

The aforementioned hydraulic control unit 18 is equipped with the valve mechanism for directly controlling the applying pressure of a predetermined frictional engagement means such as a clutch in an electrical manner, as schematically shown in FIG. 3. The aforementioned linear solenoid valve $S_{LU}$ outputs a pilot oil pressure $P_p$ according to the oil pressure command value which is outputted from the electronic control unit (T-ECU) 19 for the automatic transmission. The linear solenoid valve $S_{LU}$ is connected to a pressure regulator valve 21 for regulating the applying pressure of a clutch 20. The pressure regulator valve 21 sets a regulated pressure level according to the pilot oil pressure $P_p$. Specifically, a feedback pressure $P_f$ and the pilot oil pressure $P_p$ counteract each other in the pressure regulator valve 21 so that a line pressure $P_L$ inputted is regulated and fed to the clutch 20.

No matter whether this clutch 20 might be applied or released, the applying pressure to act upon the clutch 20 is stepwise changed. As a result, a plurality of oil pressure command values are outputted stepwise, i.e., at a plurality of stages until the applying pressure of the clutch 20 reaches a final target oil pressure. Moreover, the time periods having elapsed till the individual oil pressure command values are outputted, that is, the durations of the individual stages are changed according to the oil temperature.

Figure 4:
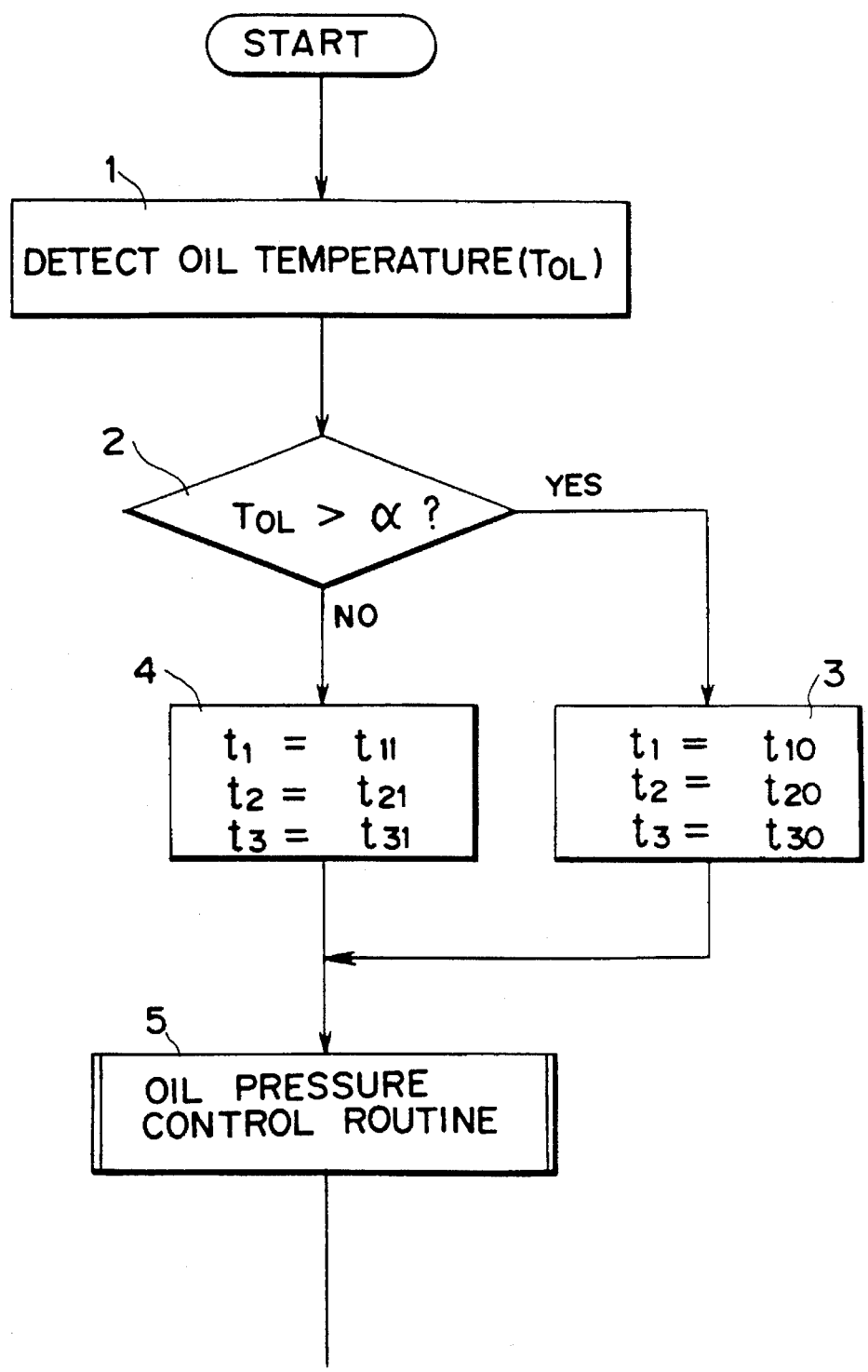
FIG. 4 is a flow chart showing a control routine for setting the durations of time of individual stages on the basis of an oil temperature.

FIG. 4 is a flow chart showing a control routine for the aforementioned operations. After an oil temperature $T_{OL}$ has been measured (at Step 1), it is decided (at Step 2) whether or not the oil temperature $T_{OL}$ is higher than a predetermined reference temperature α. If the answer of this decision is "YES", that is, if the oil temperature $T_{OL}$ is higher, the routine advances to Step 3, at which the lengths $t_1$, $t_2$ and $t_3$ of the first to third stages are set to time periods $t_{10}$, $t_{20}$ and $t_{30}$ for the higher temperature. On the contrary, if the answer of Step 2 is "NO", that is, the oil temperature is lower, the routine advances to Step 4, at which the lengths $t_1$, $t_2$ and $t_3$ of the first to third stages are set to time periods $t_{11}$, $t_{21}$ and $t_{31}$ longer than those for the higher temperature.

Here, at the first stage, the packing clearance is reduced while the return spring of the clutch 20 being compressed, and a pressure $P_1$ far lower than an applying pressure $P_4$ at the end of a shift is outputted to apply the clutch 20. The oil pressure command value at this stage is outputted such that the applying pressure is raised for a short time from a zero level to the oil pressure command value $P_1$ and such that the command value $P_1$ is kept. At the second stage, on the other hand, a shift is started, and the oil pressure command value is raised to $P_2$ ($P_4 > P_2 > P_1$). This rise of the oil pressure command value is exemplified by an increase at a predetermined gradient. Moreover, the third stage corresponds to an inertial phase for smoothing a shift. At this third stage, the oil pressure command value is gradually raised to $P_3$ ($P_4 > P_3 > P_2$).

Figure 5:
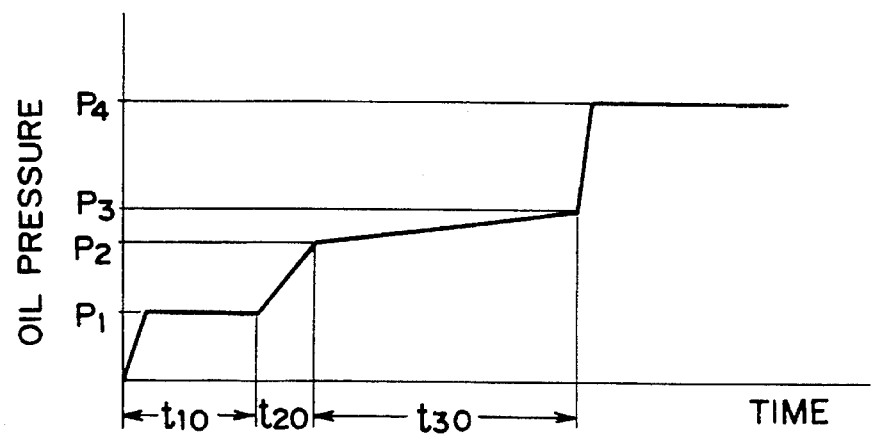
FIG. 5 is a diagram plotting a transition of an oil pressure command value in case the oil temperature is high.
Figure 6:
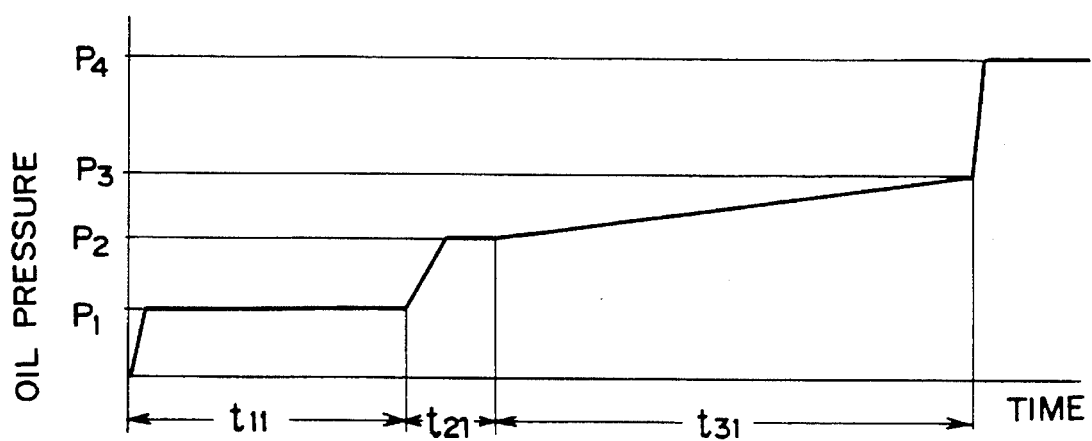
FIG. 6 is a diagram plotting a transition of an oil pressure command value in case the oil temperature is low.

In the case of a high oil temperature, therefore, the oil pressure command value changes, as illustrated in FIG. 5. On the contrary, the oil pressure command value in the case of a low oil temperature changes, as illustrated in FIG. 6. As apparent from FIGS. 5 and 6, the time periods of the individual stages, i.e., the time periods having elapsed till a subsequent oil pressure command value is outputted grow longer.

After the time periods of the individual stages have been set at Step 3 or Step 4 according to the oil temperature $T_{OL}$, the oil pressure control routine according to the time periods determined at Step 3 or 4 is executed at Step 5. As a result, a rise of the actual oil pressure to about the oil pressure command value is awaited before a subsequent oil pressure command value is outputted, even if the oil temperature is low, that is, even if the oil is highly viscous.

Figure 7:
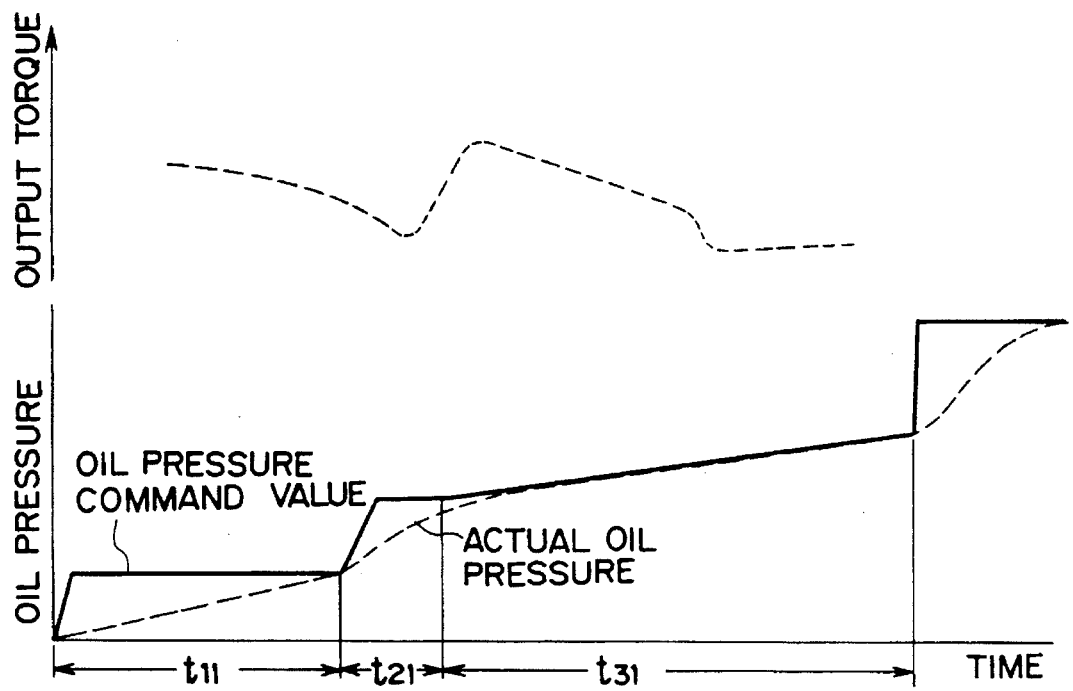
FIG. 7 is a diagram plotting changes in the actual oil pressure and the output torque in the case of a low oil temperature.
Figure 8:
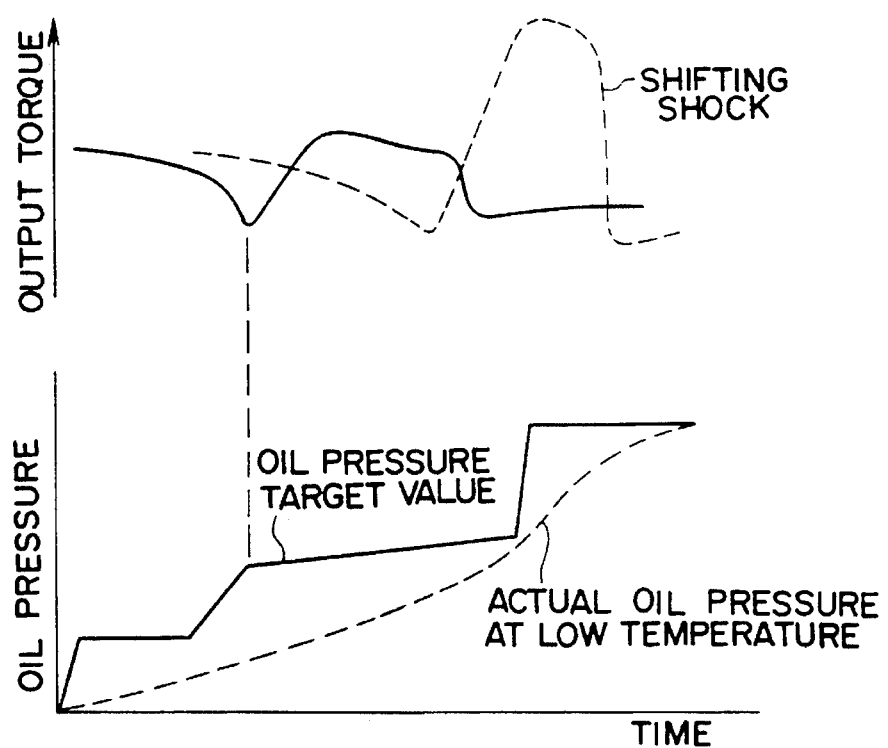
FIG. 8 is a diagram plotting transitions of the oil pressure command value, the actual oil pressure and the output torque in case the oil temperature is low in a system of the prior art.

As shown in FIG. 7, for example, the actual oil pressure, as indicated by a broken curve, grows substantially equal to the oil pressure command value because the first stage ends at the time $t_{11}$. Since the second stage is maintained till the time $t_{21}$ elapses, the actual oil pressure rises to about the oil pressure command value at the end of the second stage. Because the third stage has the long time $t_{31}$, the actual oil pressure coincides substantially with the oil pressure command value at the end of the third stage. In short, in the inertial phase, the actual oil pressure rises with a tendency similar to the oil pressure command value, and the shift is substantially completed at the end of the third stage.

The change in the output torque in the case of the aforementioned low temperature control is additionally illustrated in FIG. 7. The inertial phase is started when the second stage is substantially ended or Immediately after the third stage is started, and the shift is ended before the end of the third stage. As a result, after the end of the third stage, i.e., when the time $t_{31}$ elapses, a subsequent oil pressure command value is set to the high value $P_4$ equal to the line pressure $P_L$ so that no shifting shock occurs even if the applying pressure of the clutch 20 accordingly rises.

Here, the control described above will deteriorates the shifting characteristics because the rising time of the oil pressure is elongated. In this case, however, the elongation of the shifting time will cause no problem. This is partly because the shifting characteristics at a low temperature are intrinsically hard to become the predetermined ones and partly because the oil pressure is raised for a remarkably short time period at the low oil temperature (which will quickly rise after the start). According to the control thus far described, therefore; the drive feeling can be improved better than that of the prior art accompanied by the shifting shock.

In the foregoing embodiment, the lapse time periods of the first to third stages are made longer at a low temperature than at a high temperature. According to the present invention, however, the lapse time period of at least any one stage may be made longer at the low temperature than at the high temperature. Even this control can basically provide an effect similar to that of the aforementioned embodiment. Moreover, the number of stages to be set should not be limited to three, but the stages may be divided more. Still moreover, the oil temperature need not be decided with reference to one reference value, as in the embodiment. For example, a plurality of reference temperatures may be set to decide high, medium and low oil temperatures or more finely, so that the lapse time periods of the oil pressure command values intrinsic to the individual temperature ranges may be set. On the other hand, the present invention should not be limited to the oil pressure control in case the clutch is to be applied, as in the embodiment, but can also be applied to the control of an applying pressure in case the frictional engagement means such as the clutches or brakes are to be released.

Here will be synthetically described the advantages to be obtained from the present invention. When the applying pressure of the frictional engagement means is to be directly controlled on the basis of the electric signals, according to the hydraulic control system of the present invention, the output interval of the oil pressure command value to be outputted separately at the plurality of stages, that is, at least any one of the lapse time periods till the subsequent oil pressure command value is outputted is made longer in the case of a low oil temperature than in the case of a high oil temperature, so that the actual oil pressure is awaited to approach the oil pressure sure command value more before the subsequent oil pressure command value is outputted. As a result, the applying pressure of the frictional engagement means transits, as desired, so that the output torque will not abruptly change even with an abrupt change in the applying pressure thereby to prevent the shifting shock effectively.

What is claimed is:

1. A hydraulic control system for an automatic transmission having a valve mechanism for controlling an oil pressure to apply frictional engagement means to a value according to electric oil pressure command values inputted, so that the oil pressure of said frictional engagement means may be changed to a target value by outputting predetermined ones of said oil pressure command values to said valve mechanism at predetermined time intervals after a shift command has been outputted, comprising:

oil temperature detecting means for detecting the temperature of the oil which is to actuate said frictional engagement means; and oil pressure command value outputting means for controlling at least any one of lapse time periods between an output of succeeding ones of said oil pressure command values and for setting said at least any one of lapse time periods to be longer in case the detected oil temperature is low than in case the detected oil temperature is high.

2. A hydraulic control system according to claim 1, wherein said oil temperature detecting means includes means for outputting a signal when the detected oil temperature is lower than a predetermined reference temperature.

3. A hydraulic control system according to claim 1, wherein said oil pressure command value outputting means includes means for outputting oil pressure command values at a predetermined time intervals for at least three oil pressures including a first oil pressure for reducing a packing clearance of said frictional engagement means; a second oil pressure for setting the transmission torque capacity of said frictional engagement means to a value for changing the revolutions of a rotary member of said automatic transmission; and a third oil pressure for setting the transmission torque capacity of said frictional engagement means to a value for changing the output torque of said automatic transmission.

4. A hydraulic control system according to claim 3, wherein said oil pressure command value outputting means further includes means for making the lapse time periods longer in case the detected oil temperature is lower than a predetermined value than in case the detected oil temperature is higher than the predetermined value.

5. A hydraulic control system according to claim 3, wherein said oil pressure command value outputting means includes means for outputting the oil pressure command value to set said third oil pressure continuously till the end of a shift.

6. A hydraulic control system according to claim 5, wherein said oil pressure command value outputting means includes means for outputting an oil pressure command value to set the oil pressure to be fed to said frictional engagement means after the end of the shift to a line pressure higher than said third oil pressure.

7. A hydraulic control system according to claim 1, further comprising: a valve for outputting a pilot oil pressure according to said oil pressure command value; and a pressure regulator valve for changing the regulating level of the applying oil pressure of said frictional engagement means in accordance with said pilot oil pressure.

* * * * *

UNITED STATES PATENT AND TRADEMARK OFFICE
CERTIFICATE OF CORRECTION

PATENT NO. : 5,558,597
DATED : SEPTEMBER 24, 1996
INVENTOR(S) : HIDEHIRO OBA ET AL

It is certified that error appears in the above-indentified patent and that said Letters Patent is hereby corrected as shown below:

Claim 5, line 4, please delete "continuously".

Signed and Sealed this

Eighteenth Day of March, 1997

Attest:

BRUCE LEHMAN

Attesting Officer

Commissioner of Patents and Trademarks